United States Patent [19]
Kay et al.

[11] Patent Number: 5,875,873
[45] Date of Patent: Mar. 2, 1999

[54] AIR DISC BRAKE ANTI-RATTLE DESIGN

[75] Inventors: Joseph A. Kay, Highland, Mich.;
Kenneth G. Hooper, Redford, Mich.;
Fabio Santinato, Novara, Italy

[73] Assignee: Meritor Heavy Vehicle Systems, LLC, Troy, Mich.

[21] Appl. No.: 851,107

[22] Filed: May 5, 1997

[51] Int. Cl.⁶ ................................................ F16D 65/40
[52] U.S. Cl. ...................... 188/73.38; 188/73.37
[58] Field of Search ................ 188/73.36–73.38, 188/250 B, 250 D, 250 E, 250 G

[56]  References Cited

U.S. PATENT DOCUMENTS

| | | | |
|---|---|---|---|
| 4,428,463 | 1/1984 | Burgdorf et al. | 188/73.38 |
| 4,560,638 | 12/1985 | Gevard et al. | 188/73.38 |
| 4,564,089 | 1/1986 | Gevard | 188/73.38 |
| 4,993,520 | 2/1991 | Goddard et al. | 188/250 B |
| 5,732,800 | 3/1998 | Spignuer | 188/250 G |

*Primary Examiner*—Chris Schwartz

[57]  ABSTRACT

A disc brake includes inventive backing plates. The backing plate includes tabs located at each end with a spring supported on a top edge of the backing plate between the tabs. The spring maintains the brake pad assemblies in proper orientation with respect to the disc and reduce the amount of noise created by the brake pad assembly components while the vehicle is in operation.

17 Claims, 4 Drawing Sheets

AIR DISC BRAKE ANTI-RATTLE DESIGN

BACKGROUND OF THE INVENTION

This invention relates to a unique brake lining backing plate for a disc brake which includes tabs at each end adapted to receive a spring, such that the spring is supported between the tabs.

Disc brakes are widely used in vehicle braking systems. In a typical disc brake system, brake pad assemblies are located on either side of a rotating disc. Each brake pad assembly includes a backing plate to which brake lining friction material is attached. A brake actuator moves the brake pad assemblies toward the rotating disc such that the brake lining friction material contacts the side surfaces of the disc, thus retarding the rotation of the disc.

Certain deficiencies exist with the known disc brake systems. Specifically, during vehicle operation, the brake pad assemblies have a tendency to rattle which can be noisy and can result in premature wear of brake assembly components. To achieve optimum braking performance it is important for the brake pad assemblies to be properly positioned in relationship to the disc. Ideally, the surfaces of the brake lining friction material will be spaced at equi-distances from the surface of the disc. This clearance between the brake lining and the disc is preferably maintained as the vehicle is in operation and as it experiences road load conditions such as accelerations, decelerations, and bumps in the road. When the vehicle is braked, the brake actuator moves the brake pad assembly toward the rotating disc such that the brake lining is brought into contact with the disc. The contact between the brake lining and the disc decreases the rotational speed of the disc thus slowing or stopping the vehicle.

When the actuator is released, the brake pad assembly returns to its initial position and the clearance between the brake lining and the disc is reestablished. If the brake lining is in continual contact with the disc or if the lining comes into contact with the disc during normal vehicle operation, such as when the vehicle goes over a bump, the result is excessive noise, premature wear of the brake lining, and premature wear of the brake disc all of which are undesirable.

Anti-rattle devices, attached to the backing plate of the brake pad assembly, are used to reduce the noise of the rattling brake pad assembly components and also maintains the brake pad assemblies in proper relation to the disc. While anti-rattle devices such as springs have been used to reduce the rattle of the brake pad assemblies, they have not adequately achieved the dual function of maintaining the brake pad assemblies in proper position with relation to the disc while also significantly reducing the noise created by the rattling of the brake pad assembly components.

FIG. 1A shows one prior art backing plate 9 for a disc brake. As shown, tabs 10 are adjacent spaced ends 12 and 14 of the backing plate. Tabs 10 mount an anti-rattle spring 11. The spring 11 is not supported or contacting the backing plate 9 between the tabs 10. As such, there is not as much support from spring 11 for the backing plate 9 as may be desired.

As shown in FIG. 1B, a surface 12 which extends between the tabs 10 is spaced from a bottom surface 14 of the backing plate 9 by a lesser distance than a top surface 18 of a groove 16. Groove 16 receives an outer end 19 of the spring 11. Stated another way, a reference line R which is parallel to the bottom edge 14, and spaced adjacent to the bottom edge 14, is closer to point 19 which defines the location where the tab 10 merges into the top edge 12 than is top surface 18 of groove 16. As shown in FIGS. 1A and 1B, there is no support for the spring 11 between the tabs 10.

SUMMARY OF THE INVENTION

The subject invention relates to a backing plate for a disc brake system. Brake linings are attached to backing plates with tabs extending outwardly adjacent spaced ends of the backing plate. An actuator, attached to a fixed support member, moves the brake pad assemblies into contact with the disc. Springs extend over and are attached to the tabs of the backing plates.

The inventive backing plate includes tabs which secure the springs by having the springs snap over the tabs. The backing plates have flat surfaces spaced adjacent the tabs, and inwardly of the tabs. These flat surfaces support matching flat surfaces on the springs.

The tabs themselves have a structure such that there is a recess formed adjacent an outer face to receive a portion of the spring ends. An inner face of the tabs curves inwardly to abut the flat surfaces.

The recess is spaced by a lesser distance from the bottom of the backing plate than is the flat surface which supports the inner end of the spring. Thus, the support surface for the spring is positioned vertically above the location where the spring ends snap over the tabs. This improves the ability of the spring to hold the backing plate.

This invention improves disc brake systems by incorporating a unique backing plate which includes tabs at each end which are adapted to receive a spring such that the spring is supported between the tabs. The spring properly positions and maintains the brake pad assemblies and backing plates in proper relation to the disc and also reduces the amount of noise created by the rattling of the brake pad assembly components.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 2A:
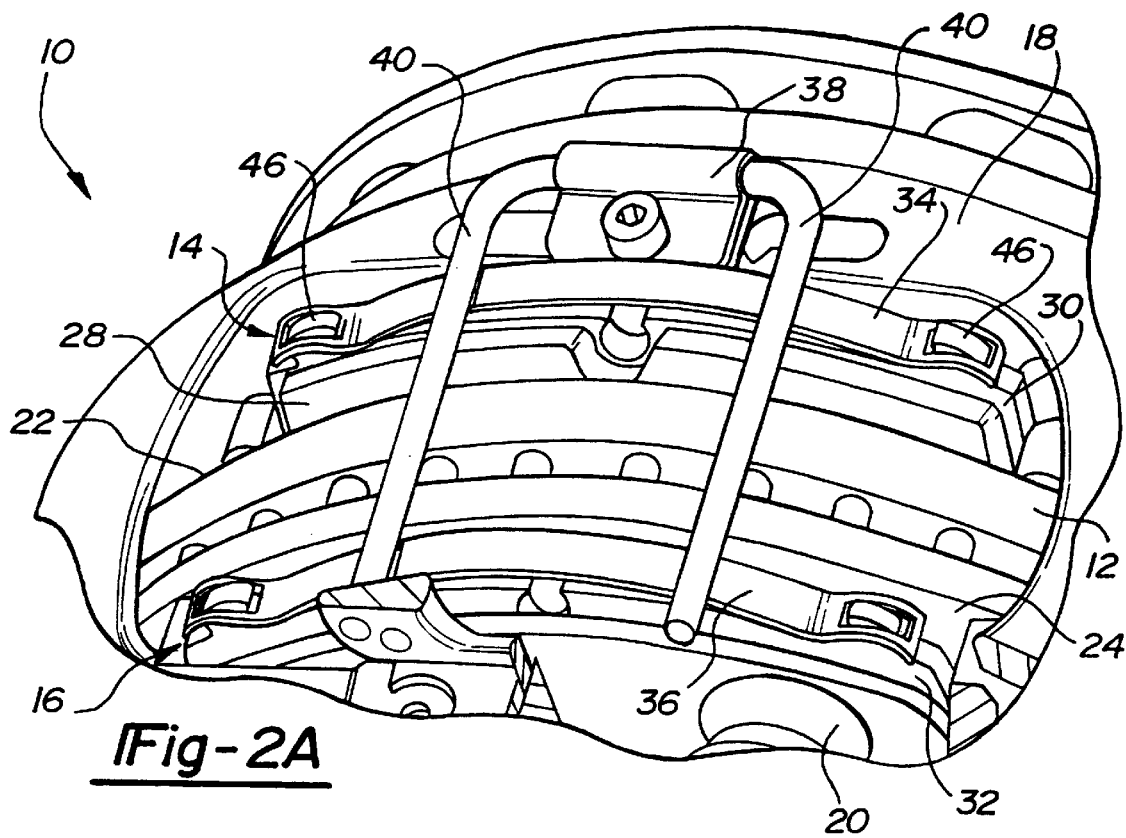
FIG. 2A is a fragmentary perspective view of a disc brake system utilizing the subject invention.

As shown in FIG. 2A, a disc brake system 10 includes a disc 12, a first brake pad assembly generally shown at 14, a second brake pad assembly generally shown at 16, a fixed support member 18, and an actuator 20. Disc 12 has a first surface 22 and a second surface 24 which face the first 14 and second 16 brake pad assemblies respectively.

Figure 2B:
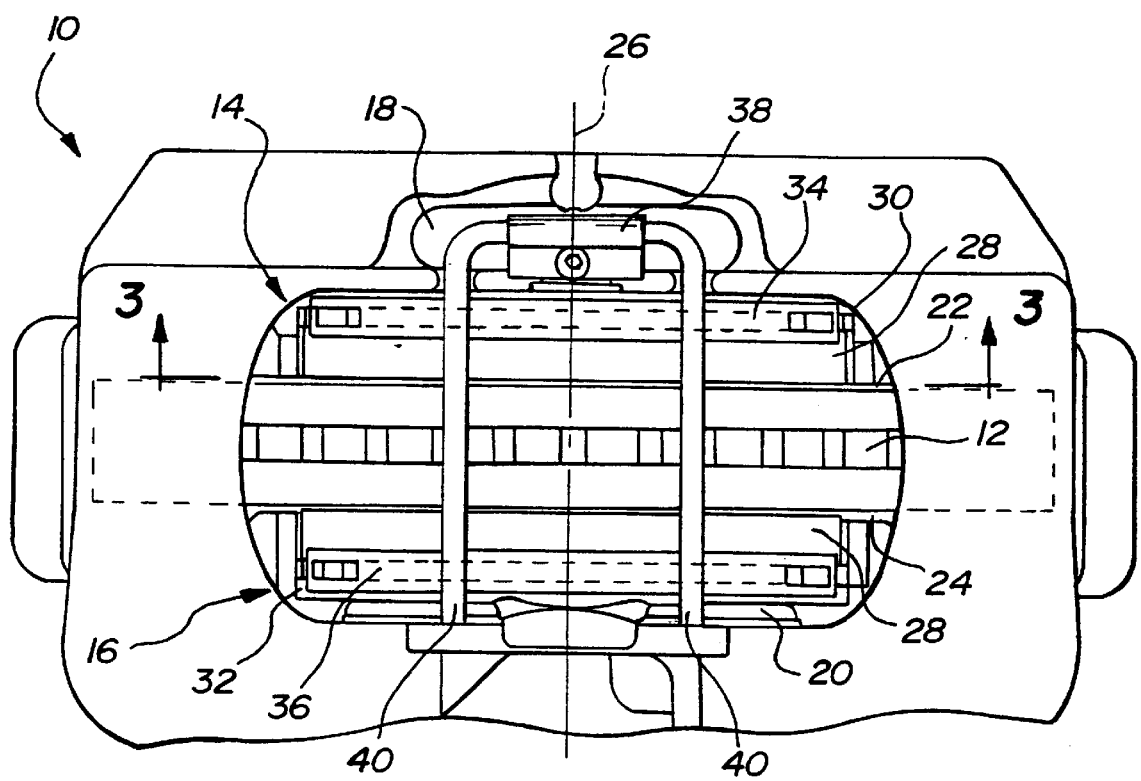
FIG. 2B is a top view, partially cut away, of the disc brake system of FIG. 1.

Disc 12 rotates about an axis of rotation 26 as shown in FIG. 2B. The first brake pad assembly 14, located adjacent to the first surface 22 of the disc 12, includes a brake lining 28 comprised of a known friction material which is attached to backing plate 30. The second brake pad assembly 16, located adjacent to the second surface 24 of the disc 12, also includes a brake lining 28 comprised of a known friction material which is attached to backing plate 32.

During a normal non-braking operation, the disc 12 is rotating about its axis of rotation 26. When braking occurs, the actuator 20, attached to the fixed support member 18, moves the first 14 and second 16 brake pad assemblies into contact with the disc 12 such that the lining 28 of the first brake pad assembly 14 touches the first surface 22 of the disc 12 and the lining 28 of the second brake pad assembly 16 touches the second surface 24 of the disc 12. The actuator and basic brake operation are as known in the art.

During non-braking operations the first 14 and second 16 brake pad assemblies have a tendency to rattle due to road load inputs from a vehicle (not shown) which may result in premature wear of brake components and excessive noise. To overcome this problem, springs 34 and 36 are attached to the backing plates 30 and 32. A stabilizer bar assembly 38, attached to the fixed support member 18, is placed over springs 34 and 36. Extending arms 40 of the stabilizer bar assembly 38 contact springs 34 and 36. The stabilizer assembly 38 is shown with two extending arms 40, however, the stabilizer bar assembly 38 could include a single extending arm 40 or more than two arms 40. As the first 14 and second 16 brake pad assemblies receive road load inputs, springs 34 and 36 compress, resulting in a restriction of movement of the brake pad assemblies 14 and 16 in relation to the disc 12. Thus, springs 34 and 36 assist in decreasing any noise caused by rattling yet still maintain the brake pad assemblies in their proper orientation with respect to the disc 12.

Figure 3A:
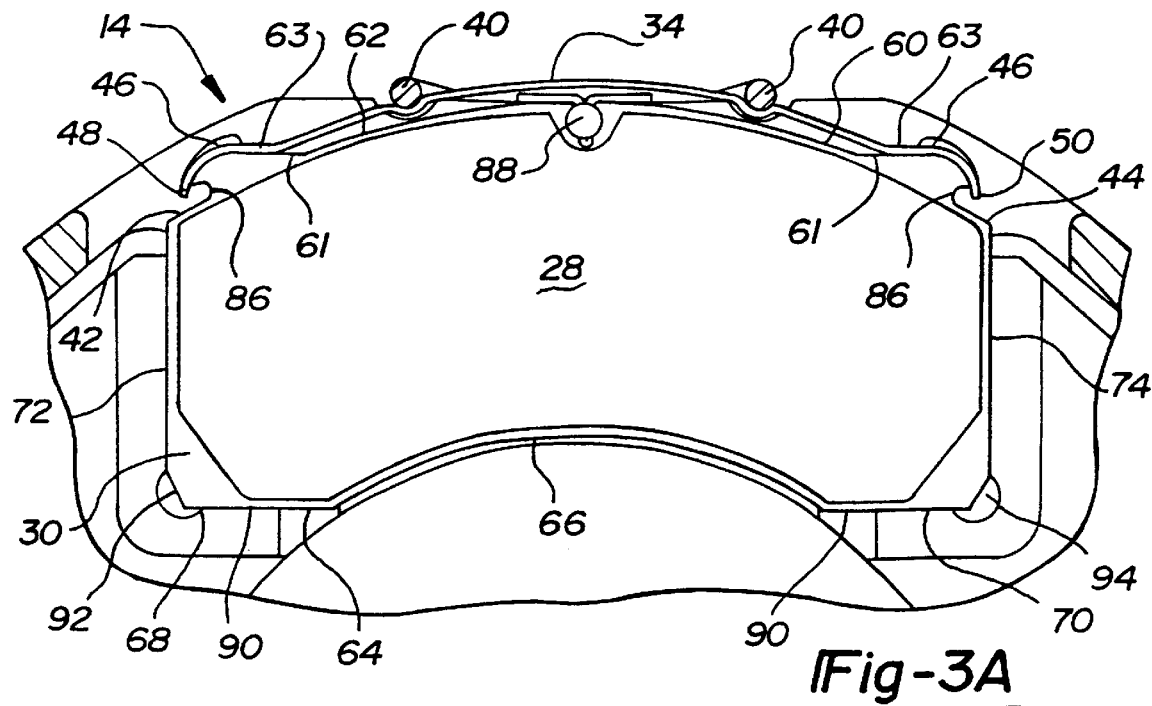
FIG. 3A is a cross sectional view taken along line 3—3 of FIG. 2.

The attachment of spring 34 to the first backing plate 30 is shown in greater detail in FIG. 3A. The first backing plate 30 has tabs 46 extending outwardly from each of its ends 42 and 44. Spring 34 extends longitudinally along the first backing plate 30, and includes ends 48 and 50, which extend over tabs 46.

The backing plates include a top edge 60 with a curved portion 62 extending between first 42 and second 44 ends. Also between the first 42 and second 44 ends are two flat portions 61, located on either side of the curved portion 62. Curved portion 61 curves upwardly away from the flat surfaces. These flat portions 61 provide a support surface for the springs 34 and 36 when attached to the backing plates.

The springs 34 and 36 include similar flat portions 63 which correspond to the flat portions 61 on the backing plates 30. When the springs 34 and 36 are compressed, contact between the flat portions 61 of the backing plates and the flat portions 63 of the springs allows for greater distribution of force along the top edge 60 of the backing plates than would occur for a single point contact.

Figure 3B:
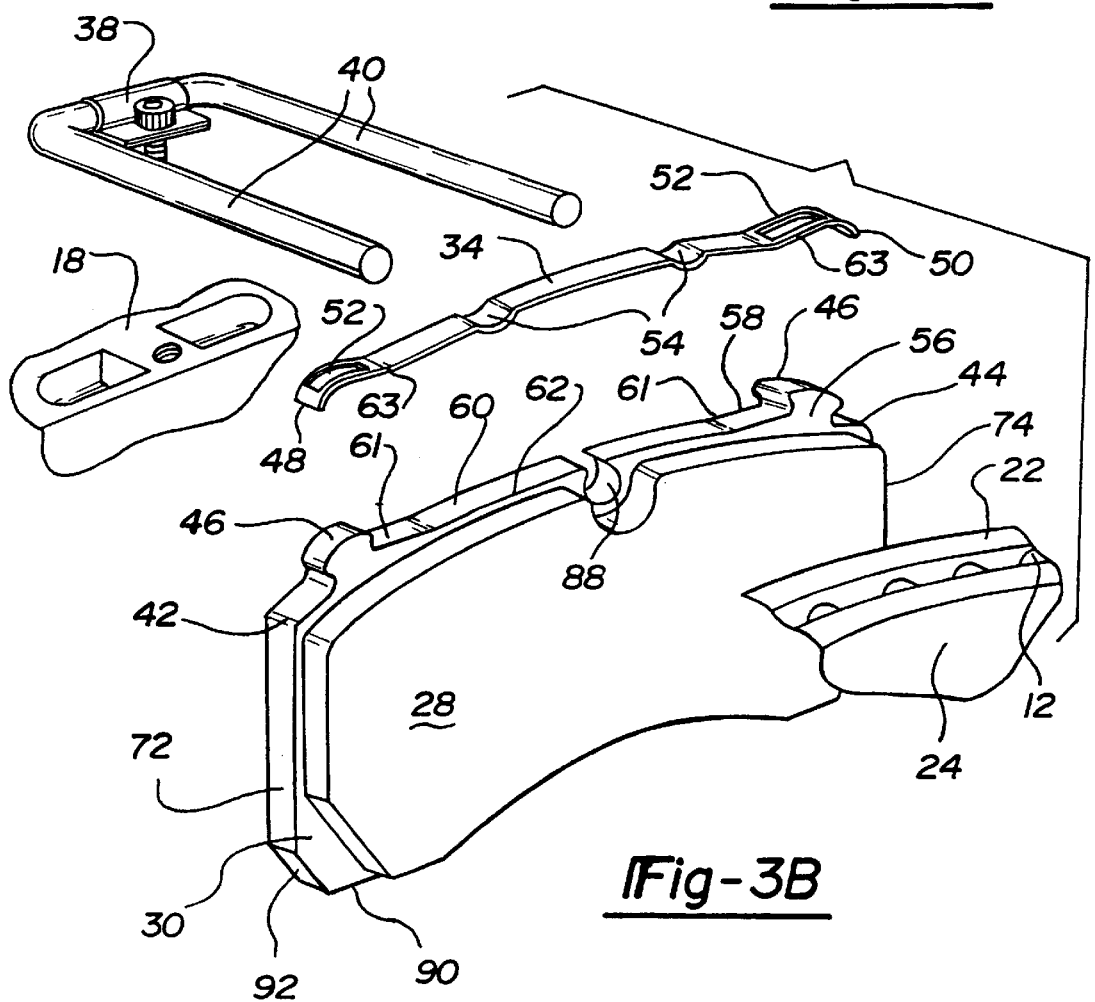
FIG. 3B is a partial exploded view of the disc brake system of the subject invention.

As shown in FIGS. 3A and 3B, first 48 and second 50 spring ends of the springs 34 and 36 curve downwardly toward the backing plates as they extend over the tabs 46, such that the ends are precluded from separating from the backing plates. The first 48 and second 50 spring ends include openings 52, as shown in FIG. 3B. Openings 52 are shown as rectangular but can be other shapes such as circular, oval, or square. Tabs 46 are inserted through these openings 52. The openings 52 are of greater length than the tabs 46 in the longitudinal direction to ease the assembly and disassembly of the spring onto the backing plate 15.

The springs also includes detent portions 54 which receive the extending arms 40 of the stabilizer bar assembly 38. The number of detent portions 54 included in the springs is dependent upon the number of extending arms 40 of the stabilizer bar assembly 38.

The first backing plate 30 includes a first surface 56 which receives the brake lining 28 and a second surface 58 located adjacent to the actuator 20. Backing plate 30 also includes a top edge 60 with a curved portion 62 extending between first 42 and second 44 ends, a bottom edge 64 with a curved portion 66 extending between first 68 and second 70 ends, a first side edge 72 which interconnects the top edge 60 and the bottom edge 64, and a second side edge 74 which interconnects the top edge 60 and the bottom edge 64. The tabs 46 are preferably located adjacent to the first 42 and second 44 ends of the top edge 60 and extend outwardly from each of the ends 42, 44. Backing plate 32 is preferably identical to backing plate 30.

As shown in FIG. 3A, the top edge 60 of the first backing plate 30 includes an opening 88 which may receive a brake lining wear indicator (not shown). A substantially straight portion 90 is disposed on each side of the curved portion 66 of the bottom edge 64. Side edges 72 and 74 are connected to the bottom edge 64 by sloped portions 92 and 94.

Figure 1A:
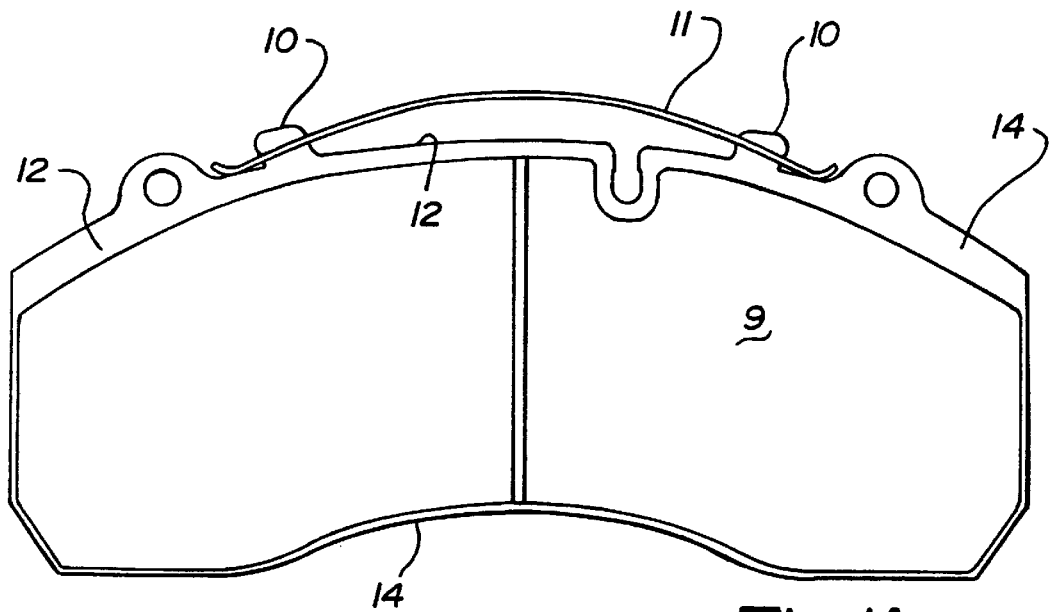
FIG. 1A shows a prior art backing plate.
Figure 1B:
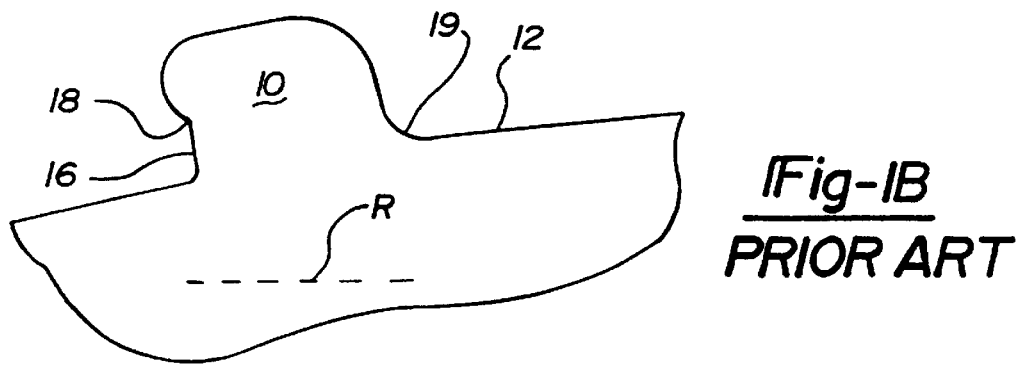
FIG. 1B shows a portion of the prior art backing plate of FIG. 1A.
Figure 4:
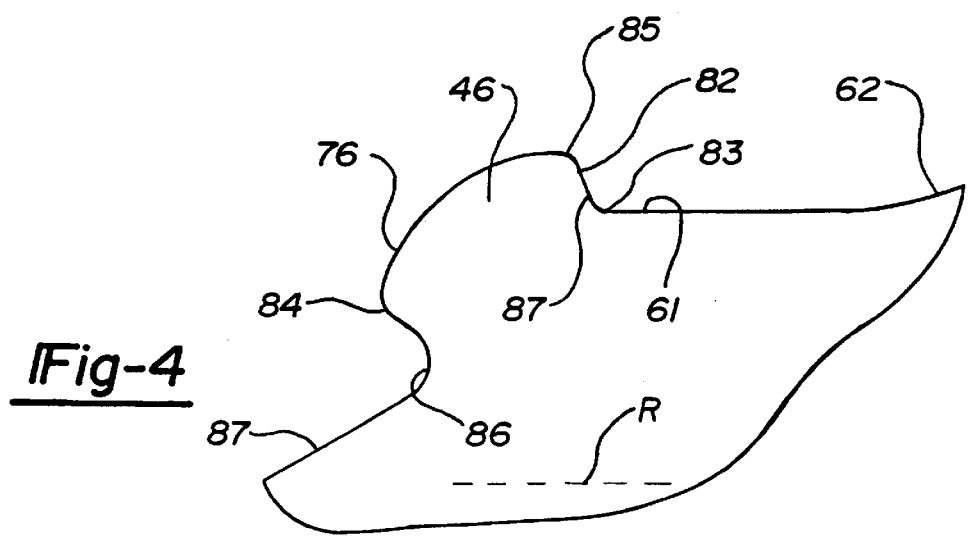
FIG. 4 is a detail view of a tab.

As shown in FIG. 4, the tabs 46 include an inner face 82 extending between a lower portion 83 and an upper portion 85. Lower end 83 merges from the outer end of the flat surface 61. An outer face 76 of tab 46 curves outwardly and downwardly to an outer facing edge 84. From edge 84, groove 86 curves downwardly and inwardly. Groove 86 merges into a further curve 87 that curves downwardly and outwardly to side walls 72 and 74. Edge 84, wherein the downwardly and outwardly curving portion 76 merges into the downwardly and inwardly curving groove 86 is at a point spaced by a lesser distance from the bottom edge of the backing plate. Here, point 84 which defines the uppermost end of the groove 86 is spaced closer to a reference line R, defined as in FIG. 1B, than is a point 83, where the flat portion 61 merges into the inner face 82.

When spring 34 or 36 is received on the inventive backing plates, the outer edges 50 are supported in grooves 86, and the flat surfaces 63 are supported on flat surfaces 61 at a location which is spaced a greater distance from the bottom of the backing plate than is the groove 86. This ensures a more secure connection for the backing plate.

Figure 5A:
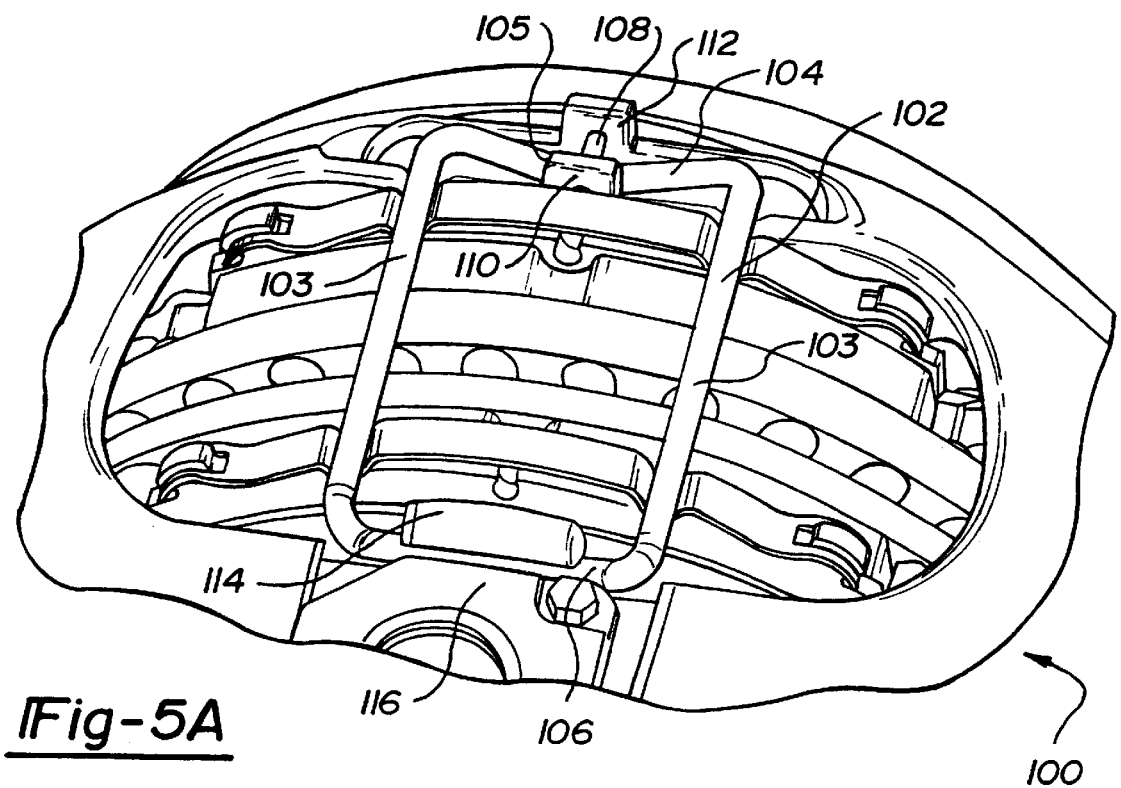
FIG. 5A shows a second embodiment brake actuator.

A second embodiment 100 shown in FIG. 5A has a stabilizer bar assembly 102 that is generally four sided. Side arms 103 extend between a first outer end 104 which is generally v-shaped and has an apex 105, and a second end 106 which is generally a straight line surface spaced away from the plane in which the sides 103 extend.

A pin 108 moves between two opposed bosses 110 and 112 to fit within the apex 105 and hold end 104 down above the backing plate and against the springs. This function is similar to the function of the stabilizing bar discussed with the first embodiment.

A ledge 114 is cast into the housing structure, and end 106 is placed underneath the ledge 114. A plate 116 is bolted outwardly of the ledge 114 once the end 106 is placed within the ledge. Plate 116 prevents the end 106 from moving outwardly of the ledge 114. As can be appreciated from FIG.

5A, the structure of the side arms 103 being at a different plane than the end 106 allows the stabilizer bar 102 to pivot upwardly within the ledge 114, and yet avoid contact with the plate 116.

Figure 5B:
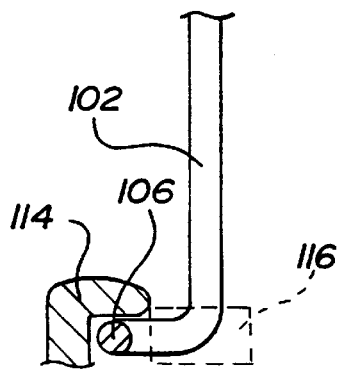
FIG. 5B shows a detail of the embodiment show in FIG. 5A.

As shown in FIG. 5B, the ledge 114 receives the end 106, and the stabilizer bar 102 may pivot to a position such as shown in FIG. 5B.

Figure 5C:
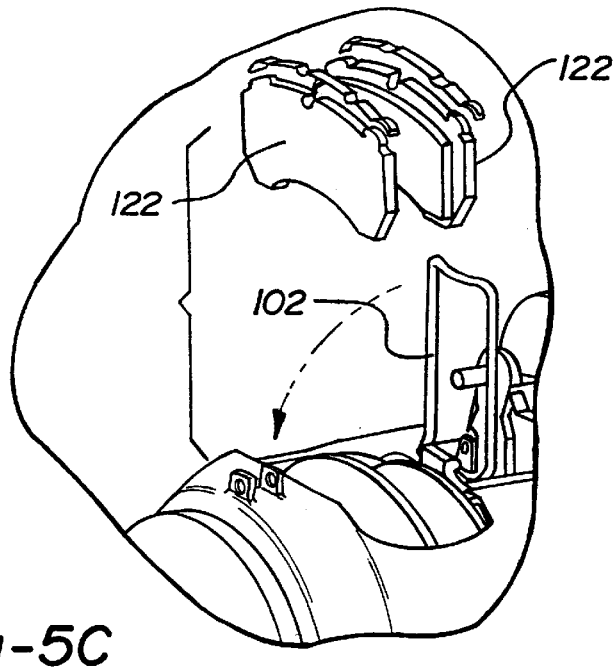
FIG. 5C shows the embodiment being moved to allow replacement of the backing plate.

As shown in FIG. 5C, once the stabilizer bar 102 is pivoted to the position shown in this figure, the backing plates 122 can be replaced or inserted. This invention thus has the benefit of not requiring removal of the stabilizer bar 102 for changing the backing plate. Instead, pin 108 is merely removed such that end 104 can move upwardly away from the backing plate with end 106 pivoting under ledge 114 to replacement. A method of installing and subsequently changing the backing plates in a disc brake is comprised of the following steps. Backing plates are provided having structure to receive springs and a stabilizing bar is provided to contact the springs. The backing plates are assembled into the disc brake and the springs are placed to hold the backing plates at a desired location. The stabilizer bar is pivoted downwardly to hold the springs and thus the backing plates at a desired location. When the backing plates need to be removed from the disc brake, for example when the brake pads need to be changed, the stabilizing bar is pivoted away from the springs and the backing plates are removed and new plates are inserted into the disc brake. Finally, the stabilizing bar is pivoted toward the springs to hold the springs and the backing plates at a desired location.

Throughout this application, one edge of the backing plate is referred to as the top edge, while the opposed edge is referred to as the bottom edge. These distinctions are made only with reference to the figures. The terms "top" and "bottom" or "up" or "down" as utilized in this application and claims are not limited to any particular orientation in application. In fact, in certain applications of the type of brakes covered by the instant invention, the "top" edge may be pointing outwardly to the side, or even could be pointing vertically downwardly from the "bottom" edge. Thus, for purposes of understanding and interpretation of the claims only, these terms are utilized with reference to the figures. There mere repositioning of the backing plate in operation such that the edge which includes the tabs points vertically downwardly does not avoid the intended scope of the claims set forth in this application.

A preferred embodiment of this invention has been disclosed, however, a worker of ordinary skill in the art would recognize that certain modifications come within the scope of this invention. For that reason, the following claims should be studied to determine the true scope and content of this invention.

We claim:

1. A disc brake system comprising:
    a rotating disc;
    a pair of brake pad assemblies including a brake lining attached to a backing plate with tabs extending outwardly at longitudinally spaced ends of said backing plate, said brake pad assemblies disposed on opposed sides of said disc;
    an actuator for moving said brake pad assemblies into contact with said disc; and
    a spring on each of said backing plates, each spring having a first spring end and a second spring end, said spring extending longitudinally between said tabs, with said first and second spring ends each extending over and attaching to one of said tabs, said spring being solely supported on a top edge of said backing plate between said tabs.

2. An assembly as set forth in claim 1, wherein said backing plates include a bottom edge, and a top edge extending between said first and second tabs, said top edge including a curved portion, and generally flat portions formed between each of said tabs and said curved portion, said flat portions supporting said spring ends.

3. An assembly as set forth in claim 2, wherein said tabs include an outwardly facing edge which curves downwardly and outwardly.

4. An assembly as recited in claim 3, wherein said tabs include a groove curving inwardly and downwardly from said outwardly facing edge and receiving said spring ends.

5. An assembly as recited in claim 4, wherein an uppermost edge of said groove is spaced from a reference line parallel and adjacent to said bottom edge by a lesser distance than said backing plate flat portions.

6. An assembly as set forth in claim 2, wherein said springs include flat spring portions located adjacent said spring ends, said flat spring portions received on said backing plate flat portions.

7. An assembly as set forth in claim 1, wherein said first and second spring ends curve downwardly toward said backing plates at a location outwardly of said tabs.

8. A backing plate for a brake pad assembly comprising:
    a first surface which receives a brake lining;
    a second surface;
    a top edge with a curved portion extending between first and second longitudinally spaced ends;
    a bottom edge;
    side edges which interconnect said top edge and said bottom edge;
    a first tab located adjacent to said first end and a second tab located adjacent to said second end, said first and second tabs extending outwardly from said top edge; and
    a spring having a first spring end adapted to fit over said first tab and a second spring end adapted to fit over said second tab, said spring extending longitudinally between said first and second tabs such that said top edge of said backing plate solely supports said spring between said first and second tabs.

9. A backing plate as recited in claim 8, wherein said first and second tabs each include an outwardly facing edge which curves downwardly and outwardly.

10. A backing plate as recited in claim 9, wherein said first and second tabs each include a groove curving inwardly and downwardly from said outwardly facing edges of said first and second tabs to said side edges, each of said grooves for receiving one of said spring ends.

11. A backing plate as recited in claim 10, wherein an uppermost edge of said grooves is spaced from said bottom edge by a lesser distance than said first and second flat portions of said top edge.

12. A backing plate as recited in claim 8, wherein said top edge include a first flat portion extending between said first tab and said curved portion, and a second flat portion extending between said second tab and said curved portion, and said spring includes a first contact face adjacent said first spring end and a second contact face adjacent said second spring end wherein said first contact face is supported on said first flat portion and said second contact face is supported on said second flat portion.

13. A backing plate as recited in claim 12, wherein said first and second contact faces are continuously supported on said first and second flat portions, respectively.

14. A backing plate as recited in claim 8, wherein said tabs include a top portion and a bottom portion said top and bottom portions being located between said side edges and said curved portion.

15. A method of installing and subsequently changing the backing plates in a disc brake comprising the steps of:
   (1) providing a stabilizing bar, providing springs to be contacted by said stabilizing bar, and providing backing plates having structure to receive said springs;
   (2) assembling said backing plates into a disc brake, placing said springs to hold said backing plate at a desired location, and moving said stabilizer bar to hold said springs and thus said backing plates at a desired location;
   (3) pivoting said stabilizing bar away from said springs to allow said backing plates to be removed or inserted into said disc brake; and
   (4) pivoting said stabilizing bar toward said springs to hold said springs and said backing plates at a desired location.

16. A backing plate for a brake pad assembly comprising:
   a first surface for receiving a brake lining;
   a top edge and a bottom edge, said top edge having a curved portion extending between first and second longitudinally spaced ends;
   tabs located adjacent each of said first and second ends extending outwardly of said top edge, said tabs being adapted to receive a spring such that said backing plate supports the spring between said tabs; and
   generally flat portions connecting said curved portion to said tabs and for supporting a spring, said tabs further being formed with a recess for receiving an outer end of said spring, an upper end of said recesses, being positioned closer to said bottom edge of said backing plate than said flat portions.

17. A backing plate for a brake pad assembly comprising:
   a first surface which receives a brake lining;
   a second surface;
   a top edge with a curved portion extending between first and second longitudinally spaced ends;
   a bottom edge;
   side edges which interconnect said top edge and said bottom edge; and
   tabs located adjacent each of said first and second ends and extending outwardly of said top edge, said tabs being adapted to receive a spring such that said backing plate supports the spring between said tabs and wherein said tabs include an outwardly facing edge which curves downwardly and outwardly.

* * * * *

UNITED STATES PATENT AND TRADEMARK OFFICE
CERTIFICATE OF CORRRECTION

PATENT NO. : 5,875,873
DATED : March 2, 1999
INVENTOR(S) : Joseph A. Kay, et al It is certified that error appears in the above-identified patent and that said Letters Patent is hereby corrected as shown below:

```
On the title page, item [56] add the following:
```

U. S. PATENT DOCUMENTS

| EXAMINER INITIAL | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|
| | 4 | 8 | 2 | 3 | 9 | 2 | 0 | 04/25/89 | Evans | | | |
| | 5 | 2 | 3 | 6 | 0 | 6 | 8 | 08/17/93 | Nagai et al. | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | 1 | 0 | 6 | 5 | 2 | 6 | 7 | | Great Britain | | | | |
| | | | | | | | | | | | | | |

Signed and Sealed this

Twenty-sixth Day of October, 1999

Attest:

Attesting Officer

Q. TODD DICKINSON

Acting Commissioner of Patents and Trademarks